United States Patent
Oh et al.

(10) Patent No.: US 7,443,076 B2
(45) Date of Patent: Oct. 28, 2008

(54) DIFFRACTIVE THIN-FILM PIEZOELECTRIC LIGHT MODULATOR AND METHOD OF FABRICATING THE SAME

(75) Inventors: Min Suk Oh, Seoul (KR); Yun Jin Ko, Seoul (KR); Jong Sam Kim, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 323 days.

(21) Appl. No.: 11/112,733

(22) Filed: Apr. 22, 2005

(65) Prior Publication Data

US 2006/0113869 A1     Jun. 1, 2006

(30) Foreign Application Priority Data

Dec. 1, 2004     (KR) ............. 10-2004-0099892

(51) Int. Cl.
*H01L 41/08* (2006.01)
(52) U.S. Cl. ............. 310/324; 310/331; 359/291
(58) Field of Classification Search .......... 310/324; 359/291
See application file for complete search history.

(56) References Cited

U.S. PATENT DOCUMENTS

| | | | |
|---|---|---|---|
| 5,311,360 A | | 5/1994 | Bloom et al. |
| 5,956,292 A | * | 9/1999 | Bernstein ............... 367/140 |
| 7,013,072 B2 | * | 3/2006 | Kinoshita ............... 385/131 |
| 7,116,456 B2 | * | 10/2006 | Hwang et al. ........... 359/223 |
| 7,129,806 B2 | * | 10/2006 | Sato ....................... 333/187 |
| 7,170,215 B2 | * | 1/2007 | Namba et al. ........... 310/324 |
| 7,170,668 B2 | * | 1/2007 | Yun ....................... 359/291 |
| 7,173,751 B2 | * | 2/2007 | Yun ....................... 359/291 |
| 7,206,118 B2 | * | 4/2007 | Yun ....................... 359/291 |
| 7,209,290 B2 | * | 4/2007 | An et al. ................. 359/572 |

* cited by examiner

*Primary Examiner*—Mark Budd
(74) *Attorney, Agent, or Firm*—Christensen O'Connor Johnson Kindness PLLC

(57) ABSTRACT

Disclosed herein is a diffractive thin-film piezoelectric light modulator, in which a lower protective layer is formed on a lower support to prevent the lower support from being over-etched when etching, thus increasing the surface smoothness of the lower support and of a micro-mirror. In addition, a method of fabricating the diffractive thin-film piezoelectric light modulator is also provided.

6 Claims, 10 Drawing Sheets

DIFFRACTIVE THIN-FILM PIEZOELECTRIC LIGHT MODULATOR AND METHOD OF FABRICATING THE SAME

BACKGROUND OF THE INVENTION

1. Field of the Invention

The present invention relates, generally, to a diffractive thin-film piezoelectric light modulator and a method of fabricating the same. More particularly, the present invention relates to a diffractive thin-film piezoelectric light modulator, in which a lower protective layer is provided between a lower support and a lower electrode layer to increase the surface smoothness of the lower support, thereby increasing the surface smoothness of a micro-mirror, and a method of fabricating the diffractive thin-film piezoelectric light modulator.

2. Description of the Related Art

Recently, micro-machining techniques for fabricating micro-optical components, such as micro-mirrors, microlenses or switches, micro-optical sensors, micro-biochips, and micro-wireless communication devices, using a process of manufacturing a semiconductor device, have been developed. MEMS (Micro-Electro-Mechanical Systems), concerning the micro-machining techniques, and the devices and systems fabricated by such techniques, are regarded as rapidly growing technologies in a broad range of commercial applications.

In particular, the micro-mirror has been commercially applied to large image displays, optical signal distributors, bar-code scanners, or optical signal decay units, or research for commercialization thereof is under study.

FIG. 1 is a perspective view showing a conventional grating light modulator using electrostatic force, which is disclosed in U.S. Pat. No. 5,311,360.

As shown in FIG. 1, a light modulator 10 disclosed in U.S. Pat. No. 5,311,360 has a plurality of equally spaced-apart deformable grating elements 18, each of which includes a light-reflective planar surface and is suspended above a silicon substrate 16. Further, an insulating layer 11 is deposited on the substrate 16, after which a sacrificial silicon dioxide layer 12 is deposited.

The silicon dioxide layer 12 is partially etched in such a way that the grating elements 18 are supported on the silicon dioxide layer 12 by a nitride frame 20.

To modulate light having a single wavelength of $\lambda_0$, the modulator 10 is designed so that the thicknesses of the grating elements 18 and the silicon dioxide layer 12 total one quarter of $\lambda_0$.

The grating amplitude of the modulator 10, which is defined by a vertical distance d between the reflective surfaces of the grating elements 18 and the reflective surface of the substrate 16, is controlled by applying voltage between the grating elements 18 and the substrate 16.

However, since the light modulator disclosed in U.S. Pat. No. 5,311,360 uses electrostatic force for position control of the micro-mirror, the switching voltage is relatively high (about 30 V) and the relationship between the applied voltage and the displacement is not linear, therefore resulting in unreliable light control.

To overcome the above problems, thin-film piezoelectric light modulators have been proposed.

In this regard, a conventional diffractive thin-film piezoelectric light modulator is shown in FIG. 2.

As shown in FIG. 2, a conventional diffractive thin-film piezoelectric light modulator 100 includes a silicon substrate 101, a lower support 102 formed on the silicon substrate 101, lower electrode layers 103 formed on both sides of the lower support 102, piezoelectric material layers 104 formed on the lower electrode layers 103, upper electrode layers 105 formed on the piezoelectric material layers 104, and a micro-mirror 106 positioned at a central portion on the lower support 102.

In the conventional diffractive thin-film piezoelectric light modulator 100, when voltage is applied to the lower electrode layer 103 and the upper electrode layer 105, the piezoelectric material layer 104 contracts and expands to allow the lower support 102 and the micro-mirror 106 to vertically move.

However, the conventional diffractive thin-film piezoelectric light modulator 100 is disadvantageous in that because the central portions of the lower electrode layer 103, the piezoelectric material layer 104 and the upper electrode layer 105 may be over-etched when etching to form the micro-mirror 106 is conducted, the central portion of the lower support 102 may also be etched.

Thus, in the conventional diffractive thin-film piezoelectric light modulator 100, the rough surface of the central portion of the lower support 102 negatively affects the surface of the micro-mirror 106.

The micro-mirror 106 of the conventional diffractive thin-film piezoelectric light modulator 100 has low reflectivity, due to its rough surface, and hence, the light efficiency is decreased.

SUMMARY OF THE INVENTION

Accordingly, the present invention has been made keeping in mind the above problems occurring in the related art, and an object of the present invention is to provide a diffractive thin-film piezoelectric light modulator, in which surface smoothness of a lower support is increased to improve the surface smoothness of a micro-mirror.

Another object of the present invention is to provide a method of fabricating such a diffractive thin-film piezoelectric light modulator.

In order to accomplish the above objects, according to a first embodiment of the present invention, a diffractive thin-film piezoelectric light modulator is provided, which comprises a substrate having a depressed portion at a central portion of the substrate to form an air space; a lower support which is attached at both ends of a bottom surface thereof to the substrate on both sides of the depressed portion of the substrate so that a central portion of the lower support is spaced a predetermined interval apart from the depressed portion of the substrate, in which the central portion of the lower support spaced apart from the depressed portion of the substrate is vertically movable; a pair of lower protective layers formed on both sides of the lower support to prevent the lower support from being over-etched; a pair of lower electrode layers formed on the lower protective layers to apply a piezoelectric voltage; a pair of piezoelectric material layers formed on the lower electrode layers to contract and expand due to the applied piezoelectric voltage so as to cause a moving force; a pair of upper electrode layers formed on the piezoelectric material layers to apply the piezoelectric voltage to the piezoelectric material layer along with the lower electrode layers; and a micro-mirror laminated at the central portion of the lower support to reflect an external incident beam of light.

In addition, a method of fabricating the diffractive thin-film piezoelectric light modulator, according to the first embodiment of the present invention, is provided, the method comprising (A) forming a depressed portion in a substrate; (B) forming a sacrificial layer in the depressed portion of the substrate; (C) forming a lower support on the substrate, and sequentially forming a lower protective layer, a lower electrode layer, a piezoelectric material layer and an upper electrode layer on the lower support; (D) sequentially removing the upper electrode layer, the piezoelectric material layer, the lower electrode layer and the lower protective layer formed on the sacrificial layer of the substrate by etching; and (E) forming a micro-mirror on the lower support on which the upper electrode layer, the piezoelectric material layer, the lower electrode layer and the lower protective layer have been removed, and removing the sacrificial layer by etching.

According to a second embodiment of the present invention, a diffractive thin-film piezoelectric light modulator is provided, which comprises a substrate; a lower support having a central portion thereof raised to be spaced a predetermined interval apart from the substrate while both ends of a bottom surface of the lower support are attached to the substrate to form an air space, in which the central portion of the lower support spaced apart from the substrate is vertically movable; a pair of lower protective layers laminated on both sides of the lower support to prevent the lower support from being over-etched; a pair of lower electrode layers formed on the lower protective layers to apply a piezoelectric voltage; a pair of piezoelectric material layers formed on the lower electrode layers to contract and expand due to the applied piezoelectric voltage so as to cause a moving force; a pair of upper electrode layers formed on the piezoelectric material layers to apply the piezoelectric voltage to the piezoelectric material layer along with the lower electrode layers; and a micro-mirror laminated at the central portion of the lower support to reflect an external incident beam of light.

In addition, a method of fabricating the diffractive thin-film piezoelectric light modulator, according to the second embodiment of the present invention, the method comprising (A) forming a patterned sacrificial layer on a substrate; (B) forming a lower support on the substrate, and sequentially forming a lower protective layer, a lower electrode layer, a piezoelectric material layer and an upper electrode layer on the lower support; (C) sequentially removing the upper electrode layer, the piezoelectric material layer, the lower electrode layer and the lower protective layer formed on the sacrificial layer of the substrate by etching; and (D) forming a micro-mirror on the lower support from which the upper electrode layer, the piezoelectric material layer, the lower electrode layer and the lower protective layer have been removed, and removing the sacrificial layer by etching.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a detailed description will be given of a diffractive thin-film piezoelectric light modulator and a method of fabricating the same, according to the present invention, with reference to the appended drawings.

Figure 1:
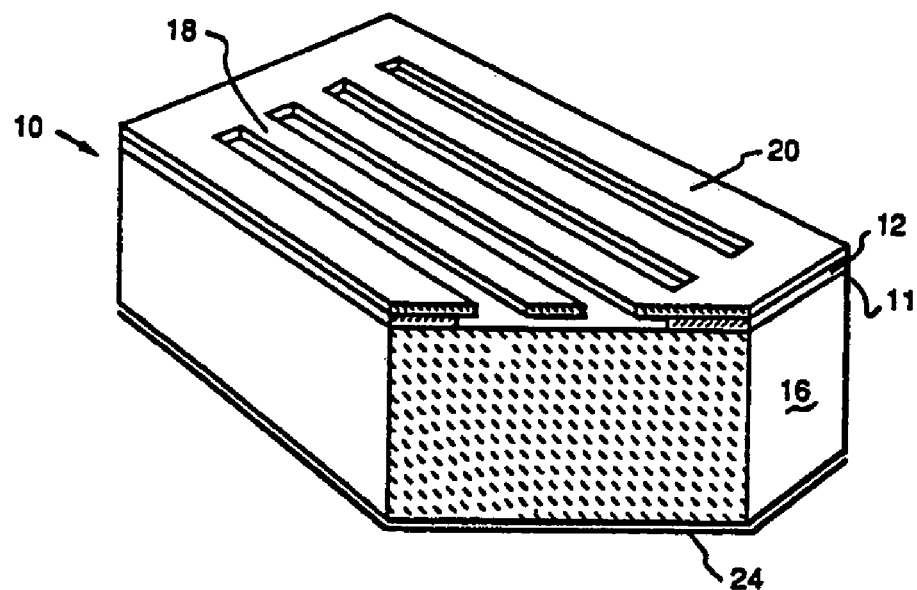
FIG. 1 is a perspective view showing a conventional grating light modulator using electrostatic force.
Figure 2:
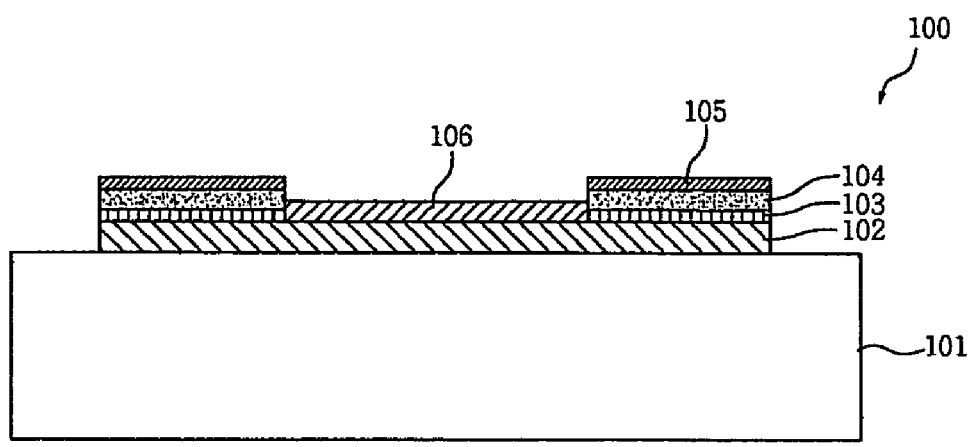
FIG. 2 is a sectional view showing a conventional diffractive thin-film piezoelectric light modulator.
Figure 3:
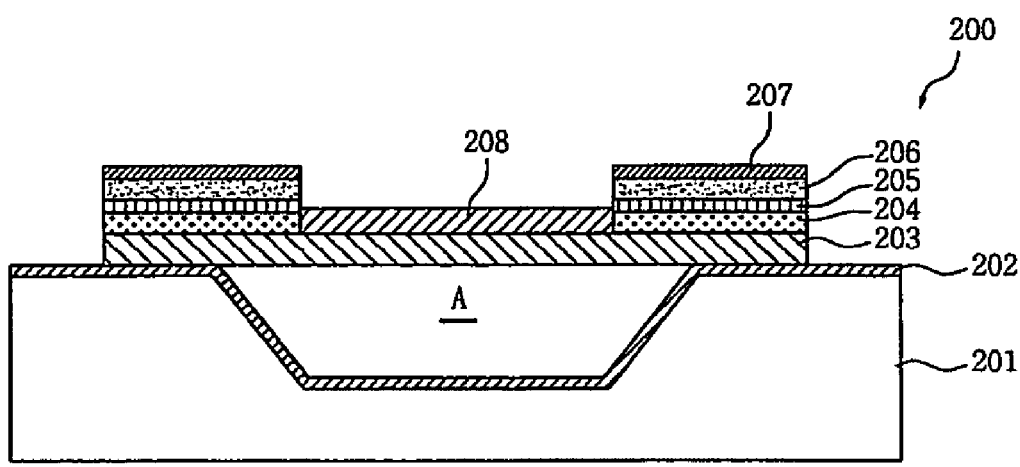
FIG. 3 is a sectional view showing a diffractive thin-film piezoelectric light modulator having a depressed portion, according to a first embodiment of the present invention.

FIG. 3 is a sectional view showing a diffractive thin-film piezoelectric light modulator having a depressed portion, according to a first embodiment of the present invention.

As shown in FIG. 3, a diffractive thin-film piezoelectric light modulator 200 having a depressed portion A includes a substrate 201 in which the depressed portion A is formed, a lower support 203 which is attached at both ends of a bottom surface thereof to the substrate 201 on both sides of the depressed portion A of the substrate 201 to cover the depressed portion A of the substrate 201, a pair of lower protective layers 204 laminated on both sides of the lower support 203, a pair of lower electrode layers 205 formed on the lower protective layers 204, a pair of piezoelectric material layers 206 formed on the lower electrode layers 205, a pair of upper electrode layers 207 formed on the piezoelectric material layers 206, and a micro-mirror 208 positioned at a central portion on the lower support 203. Preferably, the diffractive thin-film piezoelectric light modulator 200 having the depressed portion A further includes an etching prevention layer 202 formed on the substrate 201 to prevent the substrate 201 from being etched when removing a sacrificial layer to form an air space.

The substrate 201 has the depressed portion A at its central portion to provide the air space, and is preferably formed of silicon.

The etching prevention layer 202 is formed on the substrate 201 having the depressed portion A so that the substrate 201 is prevented from being etched when removing the sacrificial layer to form the air space. In the case in which the substrate 201 is formed of silicon, the etching prevention layer 202 may be an $SiO_2$ layer obtained by thermal oxidation.

The lower support 203 is attached at both ends of its bottom surface to the substrate 201 on both sides of the depressed portion A of the substrate 201 to cover the depressed portion A of the substrate 201, in which the central portion of the lower support 203 spaced apart from the depressed portion A of the substrate 201 is vertically movable. The material constituting the lower support 203 includes, for example, silicon oxide ($SiO_2$), silicon nitride ($Si_3N_4$), ceramic materials (Si, $ZrO_2$, $Al_2O_3$), SiC, etc.

The lower protective layers 204 are laminated on both sides of the lower support 203 to prevent the lower support 203 from being etched when removing the lower electrode layer 205.

In a preferred embodiment, any material may be used to constitute the lower protective layer 204 so long as it is easily etchable and has higher etching selectivity than the material constituting the lower support 203 when being etched. More preferably, any material able to be laminated on the lower support 203 at a low temperature may be used for the lower protective layer 204.

The lower electrode layer 205 is formed on the lower protective layer 204, and thus, it functions to apply a piezoelectric voltage to the piezoelectric material layer 206. The material constituting the lower electrode layer 205 includes, for example, Pt, Ta/Pt, Ni, Au, Al, $RuO_2$, etc.

The piezoelectric material layer 206 is formed on the lower electrode layer 205. When the piezoelectric material layer 206 has the voltage applied through the upper electrode layer 207 and the lower electrode layer 205 formed on the top and bottom surfaces thereof, it contracts and expands to cause a vertical moving force. The piezoelectric material constituting the piezoelectric material layer 206 includes, for example, PZT, PNN—PT, PLZT, AlN, ZnO, etc. In addition, piezoelectric material including at least one element selected from among Pb, Zr, Zn, and Ti may be used.

The upper electrode layer 207 is formed on the piezoelectric material layer 206, and thus, it functions to apply the piezoelectric voltage to the piezoelectric material layer 206, like the lower electrode layer 205. The material constituting the upper electrode layer 207 includes, for example, Pt, Ta/Pt, Ni, Au, Al, Ti/Pt, $IrO_2$, $RuO_2$, etc.

The micro-mirror 208 is positioned at the central portion of the lower support 203 to reflect an external incident beam of light. The light-reflective material constituting the micro-mirror 208 includes, for example, Ti, Cr, Cu, Ni, Al, Au, Ag, Pt, Au/Cr, etc.

FIGS. 4a to 4m are sectional views sequentially showing a process of fabricating the diffractive thin-film piezoelectric light modulator having the depressed portion, according to the first embodiment of the present invention.

Figure 4A:
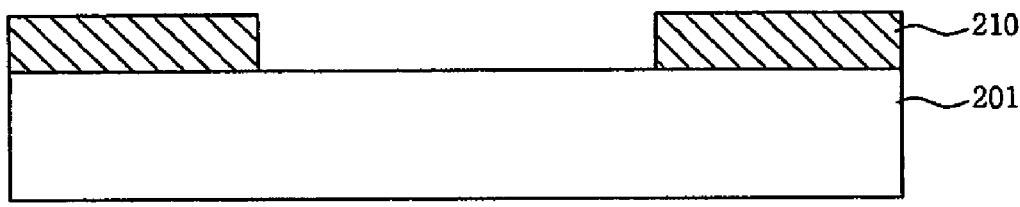
FIGS. 4a to 4m are sectional views sequentially showing a process of fabricating the diffractive thin-film piezoelectric light modulator having the depressed portion, according to the first embodiment of the present invention.

In FIG. 4a, a patterned mask layer 210 is formed on the substrate 201 by thermal oxidation, to prepare the depressed portion A.

As such, the substrate 201 is preferably formed of silicon.

Figure 4B:
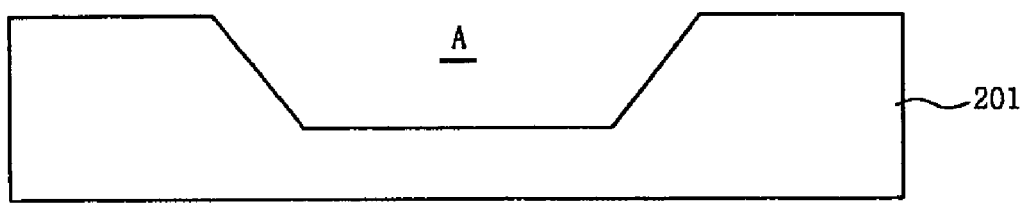

In FIG. 4b, the substrate 201 on which no mask layer 210 has been formed is etched to form the depressed portion A, after which the mask layer 210 is removed.

In the case in which the substrate 201 is formed of silicon, it is preferable that a wet etching process using TMAH or KOH as an etching solution be performed.

Alternatively, the substrate 201 may be etched by a dry etching process using plasma, instead of the wet etching process using an etching solution.

Figure 4C:
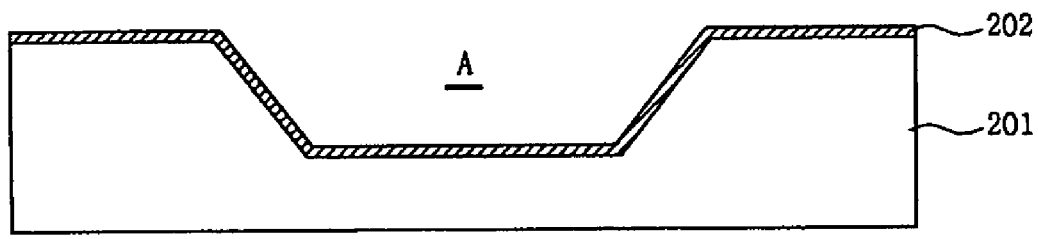

In FIG. 4c, the etching prevention layer 202 is formed on the substrate 201 having the depressed portion A by thermal oxidation.

At this time, in the case in which the substrate 201 is formed of silicon, the etching prevention layer 202 is formed of $SiO_2$.

Alternatively, the process of forming the etching prevention layer 202 may be omitted, depending on the end purpose.

Figure 4D:
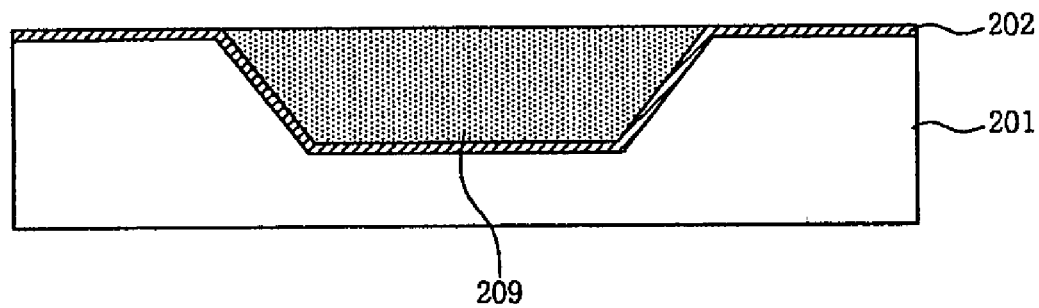

In FIG. 4d, to form the air space, poly-silicon or amorphous silicon is deposited in the depressed portion A of the substrate 201 to form the sacrificial layer 209, after which the upper surface of the sacrificial layer 209 is polished to be smooth.

As such, the deposition process of the sacrificial layer 209 is preferably exemplified by low pressure chemical vapor deposition (LPCVD) or plasma enhanced chemical vapor deposition (PECVD).

Figure 4E:
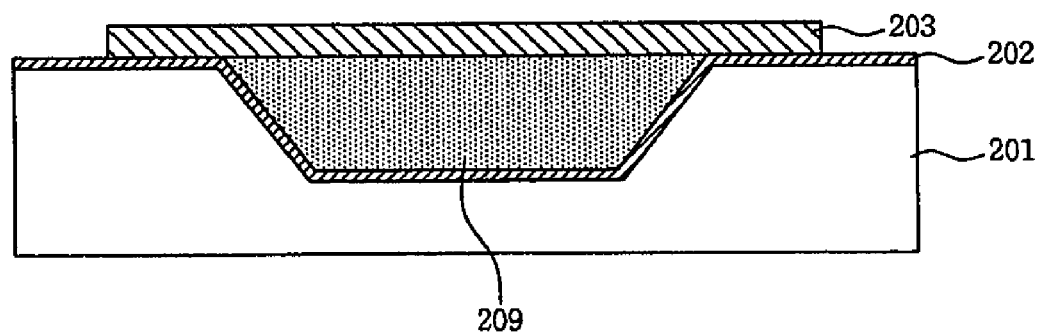

In FIG. 4e, the lower support 203 is formed on the etching prevention layer 202 and the sacrificial layer 209 on the substrate 201. Preferably, both ends of the bottom surface of the lower support 203 are attached to the etching prevention layer 202 on both sides of the sacrificial layer 209. In the absence of the etching prevention layer 202, both ends of the bottom surface of the lower support 203 are attached to the substrate 201 on both sides of the sacrificial layer 209.

The material constituting the lower support 203 includes, for example, silicon oxide ($SiO_2$), silicon nitride ($Si_3N_4$), ceramic materials (Si, $ZrO_2$, $Al_2O_3$), SiC, etc.

Figure 4F:
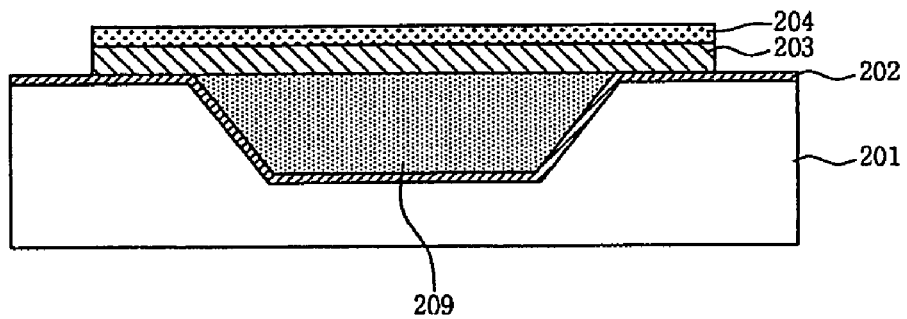

In FIG. 4f, the lower protective layer 204 is laminated on the lower support 203.

As such, the lower protective layer 204 may be formed of any material which is easily etchable and has higher etching selectivity than the material constituting the lower support 203 when being etched. Preferably, the lower protective layer 204 may consist of any material able to be laminated on the lower support 203 at a low temperature.

Figure 4G:
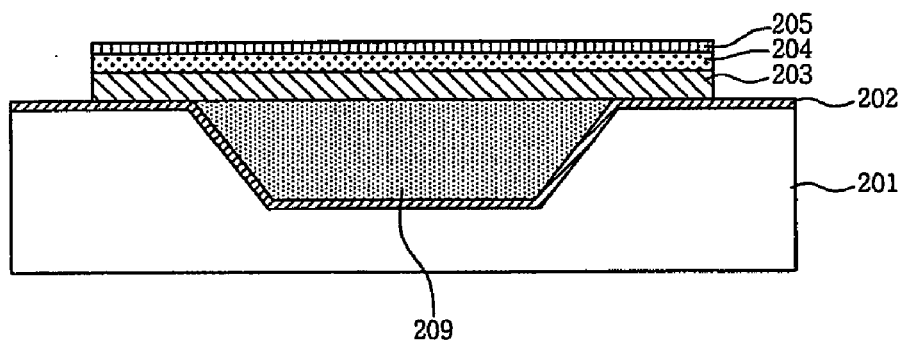

In FIG. 4g, the lower electrode layer 205 is formed on the lower protective layer 204 by sputtering or evaporation.

The material constituting the lower electrode layer 205 includes, for example, Pt, Ta/Pt, Ni, Au, Al, $RuO_2$, etc.

Figure 4H:
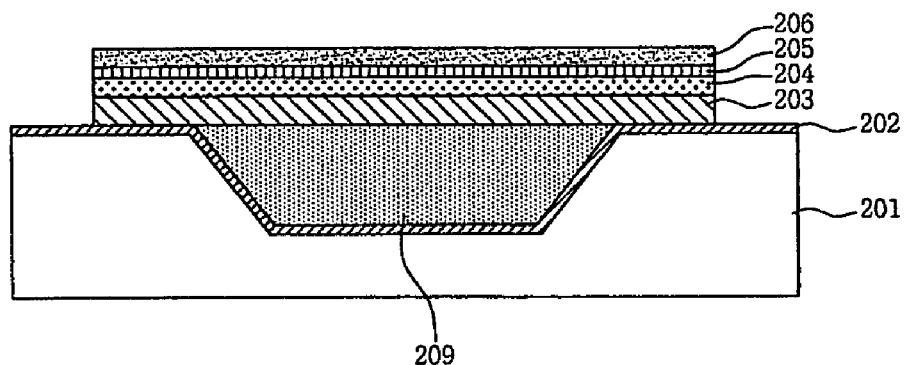

In FIG. 4h, the piezoelectric material layer 206 is formed on the lower electrode layer 205 using a wet process, such as screen printing or sol-gel coating, or a dry process, such as sputtering, evaporation, or MOCVD (Metal Organic Chemical Vapor Deposition).

The piezoelectric material constituting the piezoelectric material layer 206 includes, for example, PZT, PNN—PT, PLZT, AlN, ZnO, etc. In addition, the piezoelectric material including at least one element selected from among Pb, Zr, Zn, and Ti may be used.

Figure 4I:
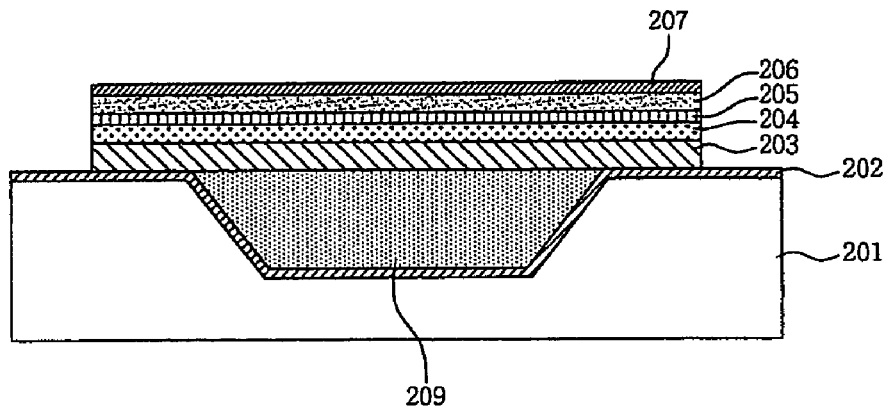

In FIG. 4i, the upper electrode layer 207 is formed on the piezoelectric material layer 206 by sputtering or evaporation.

The material constituting the upper electrode layer 207 includes, for example, Pt, Ta/Pt, Ni, Au, Al, Ti/Pt, $IrO_2$, $RuO_2$, etc.

Figure 4J:
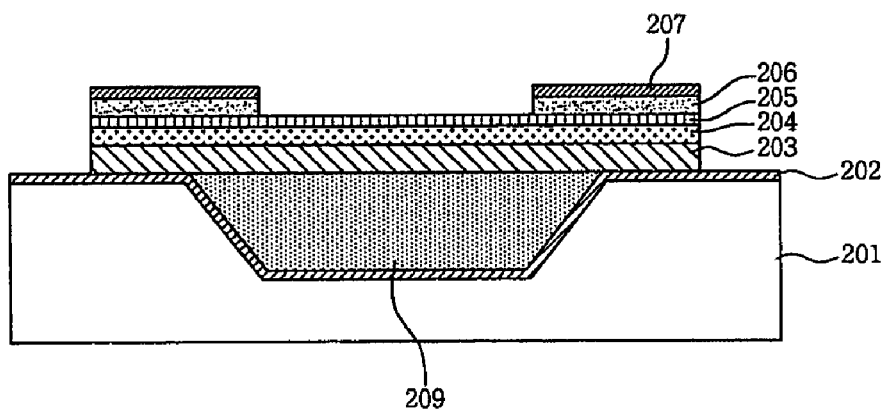

In FIG. 4j, the upper electrode layer 207 and the piezoelectric material layer 206 formed on the sacrificial layer 209 are removed by dry etching using plasma.

Figure 4K:
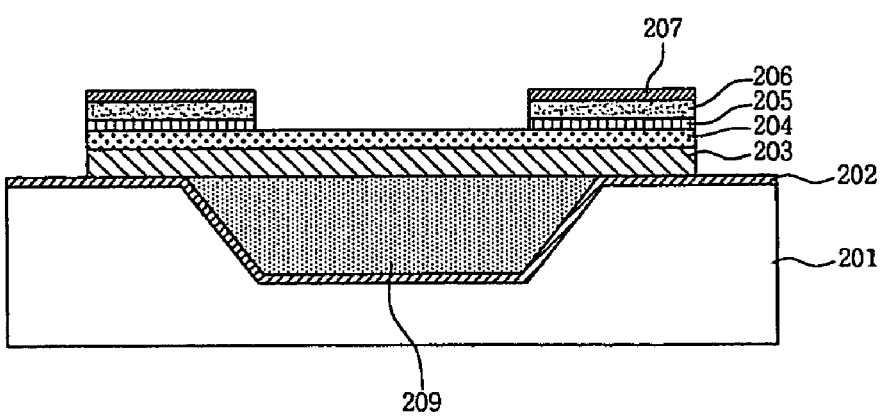

In FIG. 4k, the lower electrode layer 205 formed on the sacrificial layer 209 is removed by dry etching using plasma. At this time, the lower protective layer 204 functions to prevent over-etching of the lower support 203 so that the surface smoothness of the lower support 203 is maintained.

Figure 4L:
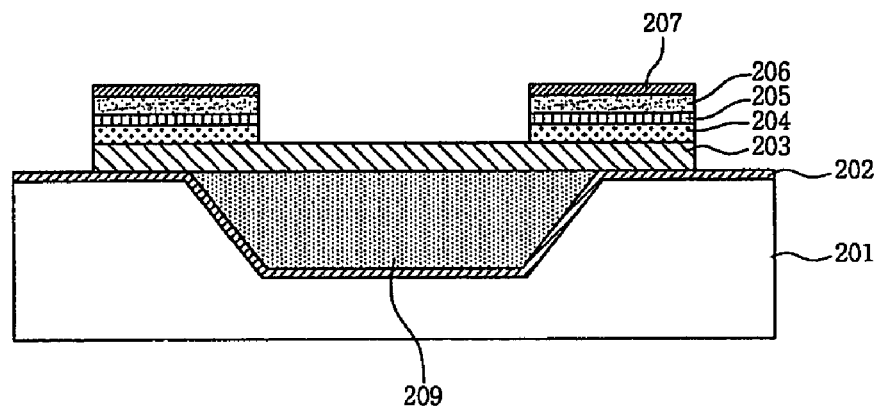

In FIG. 4l, the lower protective layer 204 formed on the sacrificial layer 209 is removed by wet etching using an etching solution.

As such, the lower protective layer 204 has a higher etching rate than the lower support 203 when etched using the etching solution. Hence, only the lower protective layer 204 may be selectively removed by controlling the etching conditions, such as the concentration of the etching solution, the etching time, and the etching temperature.

Figure 4M:
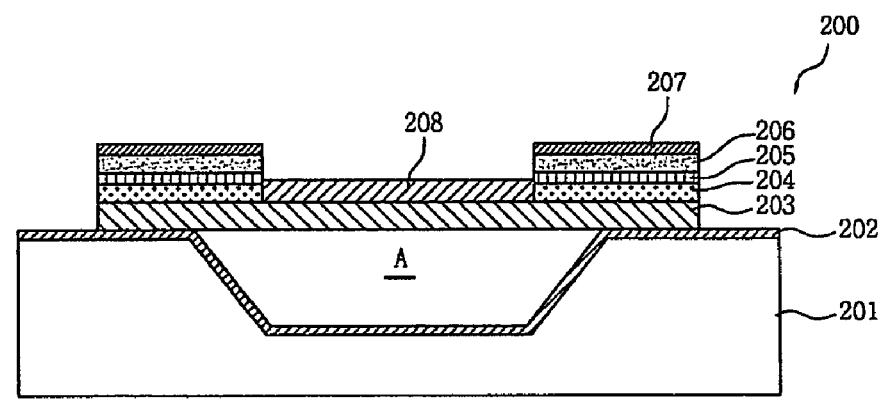

In FIG. 4m, the micro-mirror 208 is formed on the lower support 203 on which the upper electrode layer 207, the piezoelectric material layer 206, the lower electrode layer 205 and the lower protective layer 204 have been removed, and the sacrificial layer 209 is removed by etching using $XeF_2$ gas. Thereby, the diffractive thin-film piezoelectric light modulator 200 having the depressed portion A, according to the first embodiment of the present invention, is fabricated.

The light-reflective material constituting the micro-mirror 208 includes, for example, Ti, Cr, Cu, Ni, Al, Au, Ag, Pt, Au/Cr, etc.

Figure 5:
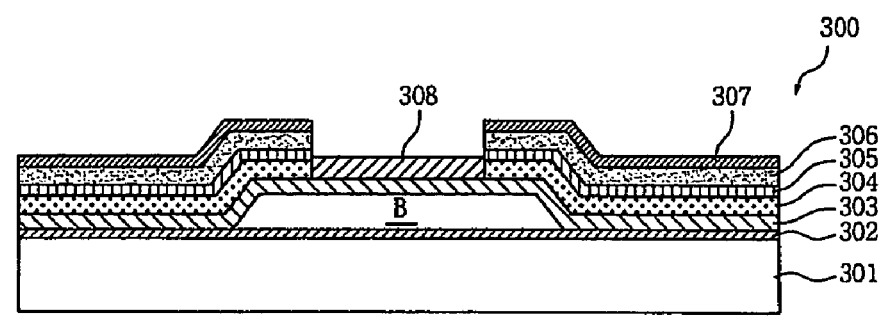
FIG. 5 is a sectional view showing a diffractive thin-film piezoelectric light modulator having a raised portion, according to a second embodiment of the present invention.

Turning now to FIG. 5, there is a sectional view showing a diffractive thin-film piezoelectric light modulator having a raised portion, according to a second embodiment of the present invention.

As shown in FIG. 5, a diffractive thin-film piezoelectric light modulator 300 having a raised portion B includes a substrate 301, a lower support 303 having its central portion raised to be spaced a predetermined interval apart from the substrate 301 while both ends of a bottom surface of the lower support 303 are attached to the substrate 301, a pair of lower protective layers 304 laminated on both sides of the lower support 303, a pair of lower electrode layers 305 formed on the lower protective layers 304, a pair of piezoelectric material layers 306 formed on the lower electrode layers 305, a pair of upper electrode layers 307 formed on the piezoelectric material layers 306, and a micro-mirror 308 positioned at a central portion of the lower support 303. Further, the diffractive thin-film piezoelectric light modulator 300 having the raised portion B preferably includes an etching prevention layer 302 formed on the substrate 301 to prevent the substrate 301 from being etched when removing a sacrificial layer to form an air space.

Specifically, the substrate 301 is preferably formed of silicon.

The etching prevention layer 302 is formed on the substrate 301 so as to prevent the substrate 301 from being etched when removing the sacrificial layer to form the air space. In the case in which the substrate 301 is formed of silicon, the etching prevention layer 302 may be an $SiO_2$ layer obtained by thermal oxidation.

As for the lower support 303, while the central portion of the lower support 303 is raised to be spaced a predetermined interval apart from the substrate 301, both ends of the bottom surface of the lower support 303 are attached to the substrate 301, in which the central portion of the lower support 303 spaced a predetermined interval apart from the substrate 301 is vertically movable. The constitutive material of the lower support 303 includes, for example, silicon oxide ($SiO_2$), silicon nitride ($Si_3N_4$), ceramic materials (Si, $ZrO_2$, $Al_2O_3$), SiC, etc.

The lower protective layers 304 are laminated on both sides of the lower support 303 to prevent the lower support 303 from being etched when removing the lower electrode layer 305.

In a preferred embodiment, any material may be used for the lower protective layer 304 so long as it is easily etchable and has higher etching selectivity than the constitutive material of the lower support 303 when being etched. More preferably, any material able to be formed on the lower support 303 at a low temperature may be used for the lower protective layer 304.

The lower electrode layer 305 is formed on the lower protective layer 304 so as to apply the piezoelectric voltage to the piezoelectric material layer 306. The constitutive material of the lower electrode layer 305 includes, for example, Pt, Ta/Pt, Ni, Au, Al, $RuO_2$, etc.

The piezoelectric material layer 306 is formed on the lower electrode layer 305. When the piezoelectric material layer 306 has the voltage applied through the upper electrode layer 307 and the lower electrode layer 305 formed on the top and bottom surfaces thereof, it may contract and expand to cause a vertical moving force. The piezoelectric material constituting the piezoelectric material layer 306 includes, for example, PZT, PNN—PT, PLZT, AlN, ZnO, etc. In addition, the piezoelectric material including at least one element selected from among Pb, Zr, Zn, and Ti may be used.

The upper electrode layer 307 is formed on the piezoelectric material layer 306 so as to apply the piezoelectric voltage to the piezoelectric material layer 306, like the lower electrode layer 305. The constitutive material of the upper electrode layer 307 includes, for example, Pt, Ta/Pt, Ni, Au, Al, Ti/Pt, $IrO_2$, $RuO_2$, etc.

The micro-mirror 308 is positioned at the central portion of the lower support 303 so as to reflect an external incident beam of light. The light-reflective material constituting the micro-mirror 308 includes, for example, Ti, Cr, Cu, Ni, Al, Au, Ag, Pt, Au/Cr, etc.

FIGS. 6a to 6k are sectional views sequentially showing a process of fabricating the diffractive thin-film piezoelectric light modulator having the raised portion, according to the second embodiment of the present invention.

Figure 6A:
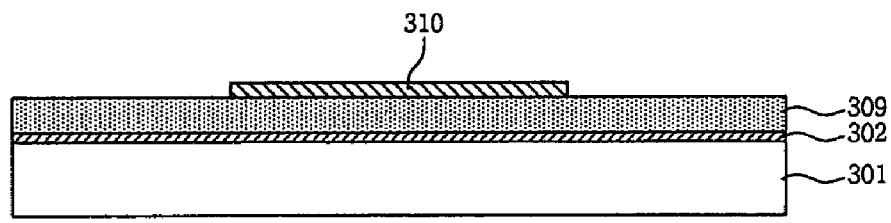
FIGS. 6a to 6k are sectional views sequentially showing a process of fabricating the diffractive thin-film piezoelectric light modulator having the raised portion, according to the second embodiment of the present invention.

In FIG. 6a, the etching prevention layer 302 is formed on the substrate 301 by thermal oxidation. To provide the air space, poly-silicon or amorphous silicon is deposited on the etching prevention layer 302 by LPCVD or PECVD to form the sacrificial layer 309, after which the upper surface of the sacrificial layer 309 is polished to be even. Subsequently, a patterned mask layer 310 is formed on the sacrificial layer 309 by thermal oxidation.

When the substrate 301 is a silicon substrate, the etching prevention layer 302 is formed of $SiO_2$.

Alternatively, the process of forming the etching prevention layer 302 may be omitted, depending on the end purpose.

Figure 6B:
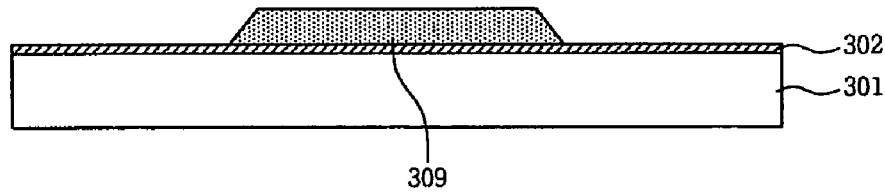

In FIG. 6b, the portion of the sacrificial layer 309 on which no mask layer 310 has been formed is etched, and then, the mask layer 310 is removed.

Figure 6C:
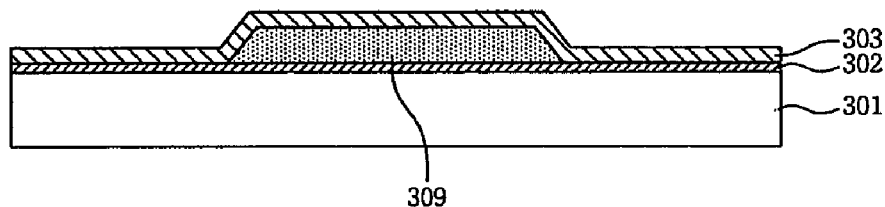

In FIG. 6c, the lower support 303 is formed on the etching prevention layer 302 and the sacrificial layer 309 on the substrate 301. As such, both ends of the bottom surface of the lower support 303 are attached to the etching prevention layer 302 on both sides of the sacrificial layer 309. If the etching prevention layer 302 is not formed, both ends of the bottom surface of the lower support 303 are attached to the substrate 301 on both sides of the sacrificial layer 309.

The constitutive material of the lower support 303 includes, for example, silicon oxide ($SiO_2$), silicon nitride ($Si_3N_4$), ceramic materials (Si, $ZrO_2$, $Al_2O_3$), SiC, etc.

Figure 6D:
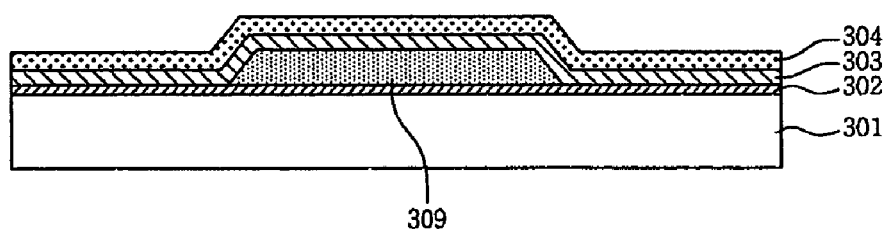

In FIG. 6d, the lower protective layer 304 is formed on the lower support 303.

As such, any material may be used for the lower protective layer 304 so long as it is easily etchable and has higher etching selectivity than the constitutive material of the lower support 303 when etched. Preferably, the lower protective layer 304 may consist of any material capable of being laminated on the lower support 303 at a low temperature.

Figure 6E:
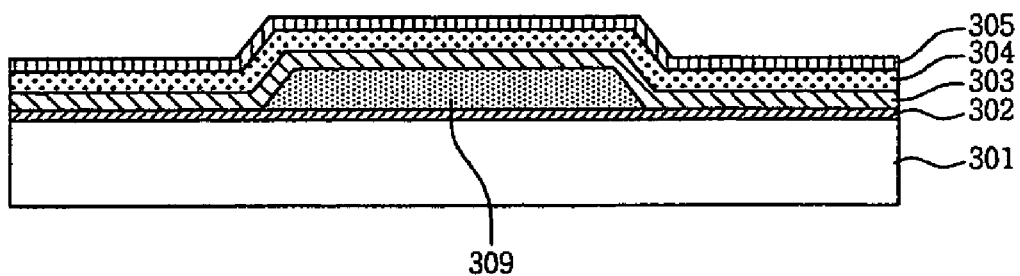

In FIG. 6e, the lower electrode layer 305 is formed on the lower protective layer 304 by sputtering or evaporation.

The constitutive material of the lower electrode layer 305 includes, for example, Pt, Ta/Pt, Ni, Au, Al, $RuO_2$, etc.

Figure 6F:
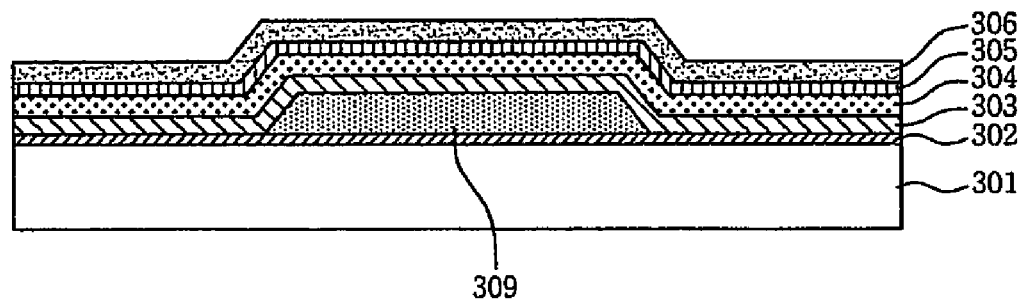

In FIG. 6f, the piezoelectric material layer 306 is formed on the lower electrode layer 305 using a wet process, such as screen printing or sol-gel coating, or a dry process, such as sputtering, evaporation or MOCVD.

The piezoelectric material constituting the piezoelectric material layer 306 includes, for example, PZT, PNN—PT, PLZT, AlN, ZnO, etc. In addition, piezoelectric material including at least one element selected from among Pb, Zr, Zn, and Ti may be used.

Figure 6G:
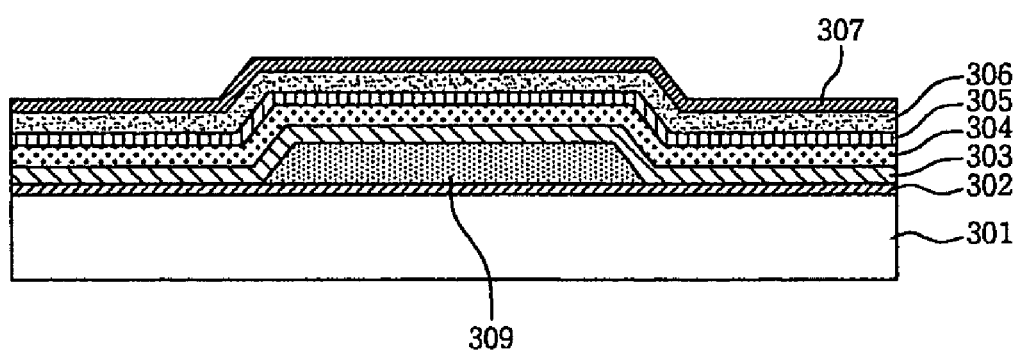

In FIG. 6g, the upper electrode layer 307 is formed on the piezoelectric material layer 306 by sputtering or evaporation.

The constitutive material of the upper electrode layer 307 includes, for example, Pt, Ta/Pt, Ni, Au, Al, Ti/Pt, $IrO_2$, $RuO_2$, etc.

Figure 6H:
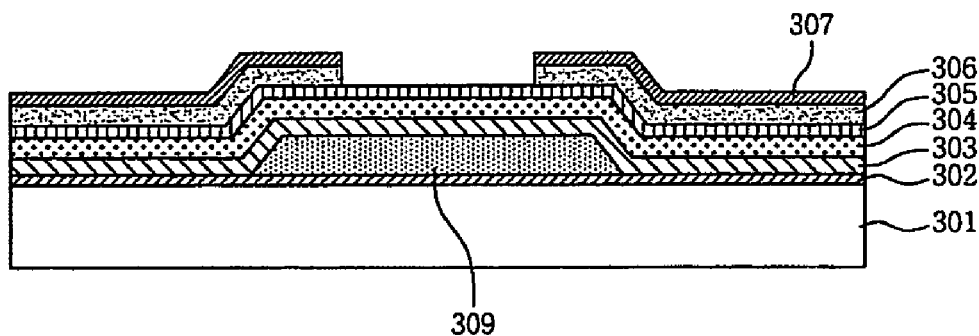

In FIG. 6h, the upper electrode layer 307 and the piezoelectric material layer 306 formed on the sacrificial layer 309 are removed by dry etching using plasma.

Figure 6I:
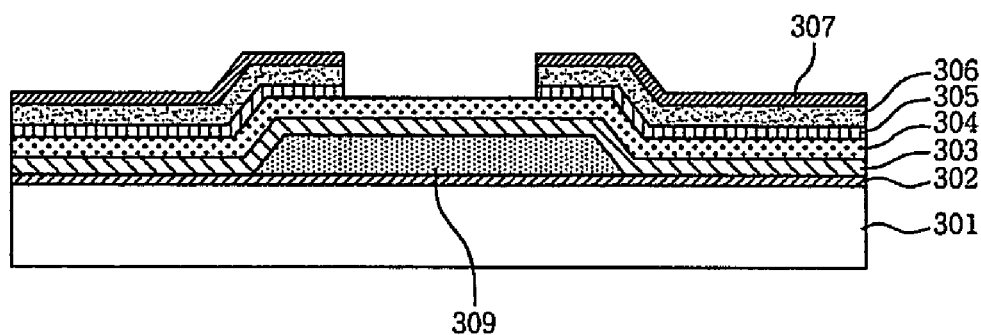

In FIG. 6i, the lower electrode layer 305 formed on the sacrificial layer 309 is removed by dry etching using plasma. In this case, the lower protective layer 304 functions to prevent over-etching of the lower support 303 so that the smoothness of the surface of the lower support 303 is maintained.

Figure 6J:
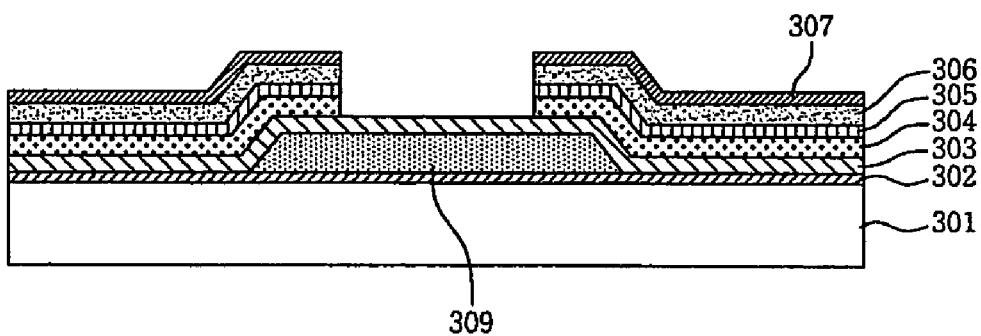

In FIG. 6j, the lower protective layer 304 formed on the sacrificial layer 309 is removed by wet etching using an etching solution.

As such, the lower protective layer 304 has a higher etching rate than the lower support 303 when being etched using the etching solution. Therefore, only the lower protective layer 304 may be selectively removed by controlling the etching conditions, such as the concentration of the etching solution, the etching time, and the etching temperature.

Figure 6K:
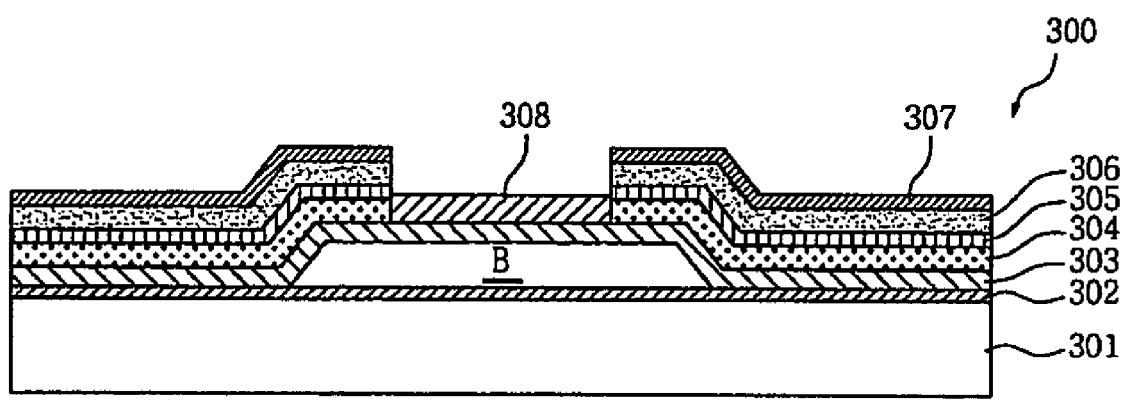

In FIG. 6k, the micro-mirror 308 is formed on the lower support 303 from which the upper electrode layer 307, the piezoelectric material layer 306, the lower electrode layer 305 and the lower protective layer 304 have been removed. The sacrificial layer 309 is removed by etching using $XeF_2$ gas. Thereby, the diffractive thin-film piezoelectric light modulator 300 having the raised portion B, according to the second embodiment of the present invention, is fabricated.

The light-reflective material constituting the micro-mirror 308 includes, for example, Ti, Cr, Cu, Ni, Al, Au, Ag, Pt, Au/Cr, etc.

In the diffractive thin-film piezoelectric light modulator 200 or 300, according to the first and second embodiments of the present invention, the piezoelectric material layer 206 or 306 is formed in a single layer structure. However, the piezoelectric material layer 206 or 306 may be formed in a multi-layer structure for operation at a low voltage. If so, the lower electrode layer 205 or 305 and the upper electrode layer 207 or 307 may be formed in a multi-layer structure.

That is, a first lower electrode layer, a first piezoelectric material layer, a first upper electrode layer, a second lower electrode layer, a second piezoelectric material layer, a second upper electrode layer, and so on, may be continuously formed upwards.

As described above, the present invention provides a diffractive thin-film piezoelectric light modulator and a method of fabricating the diffractive thin-film piezoelectric light modulator, in which the lower protective layer is formed on the lower support so that the lower support is prevented from being over-etched upon removal of the lower electrode layer. Thereby, the lower support has improved surface smoothness, and thus, the surface smoothness of the micro-mirror is increased.

With respect to the diffractive thin-film piezoelectric light modulator and its fabrication method, the light modulator has improved light efficiency and a micro-mirror having improved reflectivity, due to high surface smoothness of the micro-mirror.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A diffractive thin-film piezoelectric light modulator, comprising:
   a substrate having a depressed portion at a central portion of the substrate to form an air space;
   a lower support which is attached at both ends of a bottom surface thereof to the substrate on both sides of the depressed portion of the substrate so that a central portion of the lower support is spaced a predetermined interval apart from the depressed portion of the substrate, in which the central portion of the lower support spaced apart from the depressed portion of the substrate is vertically movable;
   a pair residual of lower protective layers positioned on both sides of the lower support remaining from a lower protective layer that nominally covered the lower support to prevent the portion of the lower support corresponding to the depressed portion of the substrate from being over-etched;
   a pair of lower electrode layers disposed on the lower protective layers to apply a piezoelectric voltage;
   a pair of piezoelectric material layers disposed on the lower electrode layers to contract and expand due to the applied piezoelectric voltage so as to cause a moving force;
   a pair of upper electrode layers disposed on the piezoelectric material layers to apply the piezoelectric voltage to the piezoelectric material layer along with the lower electrode layers; and
   a micro-mirror positioned at the central portion of the lower support to reflect an external incident beam of light.

2. The light modulator as set forth in claim 1, further comprising an etching prevention layer disposed on the depressed portion of the substrate under the lower support, to prevent the substrate from being etched.

3. The light modulator as set forth in claim 1, further comprising at least one lower electrode layer, at least one piezoelectric material layer and at least one upper electrode layer, sequentially positioned on the upper electrode layer.

4. A diffractive thin-film piezoelectric light modulator, comprising:
   a substrate;
   a lower support having a central portion thereof raised to be spaced a predetermined interval apart from the substrate while both ends of a bottom surface of the lower support are attached to the substrate so as to form an air space, in which the central portion of the lower support spaced apart from the substrate is vertically movable;
   a pair residual of lower protective layers disposed on both sides of the lower support remaining from a lower protective layer that minimally covered the central portion of the lower support to prevent the central portion of the lower support from being over-etched;
   a pair of lower electrode layers disposed on the lower protective layers to apply a piezoelectric voltage;
   a pair of piezoelectric material layers disposed on the lower electrode layers to contract and expand due to the applied piezoelectric voltage so as to cause a moving force;
   a pair of upper electrode layers disposed on the piezoelectric material layers to apply the piezoelectric voltage to the piezoelectric material layer along with the lower electrode layers; and
   a micro-mirror laminated at the central portion of the lower support to reflect an external incident beam of light.

5. The light modulator as set forth in claim 4, further comprising an etching prevention layer positioned on the substrate under the lower support, to prevent the substrate from being etched.

6. The light modulator as set forth in claim 4, further comprising at least one lower electrode layer, at least one piezoelectric material layer and at least one upper electrode layer, sequentially disposed on the upper electrode layer.

* * * * *